United States Patent
Kitamori et al.

(10) Patent No.: US 7,420,924 B2
(45) Date of Patent: Sep. 2, 2008

(54) TRANSMISSION DEVICE

(75) Inventors: Katsuya Kitamori, Kawasaki (JP); Nobuhiro Rikitake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 592 days.

(21) Appl. No.: 11/066,499

(22) Filed: Feb. 28, 2005

(65) Prior Publication Data

US 2006/0104316 A1    May 18, 2006

(30) Foreign Application Priority Data

Nov. 17, 2004  (JP)  ............................. 2004-332881

(51) Int. Cl.
*G01R 31/08*  (2006.01)

(52) U.S. Cl. ..................... 370/241; 370/216

(58) Field of Classification Search ......... 370/216–224, 370/226, 229, 241, 242, 246–254; 714/2, 714/15, 16, 43, 46, 48, 712, 716, 717, 720; 340/514, 619, 3.42, 3.43, 203, 216; 398/16, 398/17, 20, 22, 23, 59, 138, 139, 148, 156, 398/108

See application file for complete search history.

(56) References Cited

U.S. PATENT DOCUMENTS 7,154,894 B1 *  12/2006  Tsukamoto ............... 370/395.1

FOREIGN PATENT DOCUMENTS

| JP | 02141130 A | 5/1990 |
| JP | 06132896 A | 5/1994 |
| JP | 10/336322 | 12/1998 |
| JP | 2004-040441 | 2/2004 |

* cited by examiner

*Primary Examiner*—Chirag G Shah
*Assistant Examiner*—Ramtin Kangarloo
(74) *Attorney, Agent, or Firm*—Hanify & King, P.C.

(57) ABSTRACT

In a state where although the setting of a line between a transmitting station and a receiving station is completed, no signal is transmitted, a test signal in a prescribed format is transmitted from the transmitting station. By transmitting the test signal, no signal disconnection is detected by each alarm detection point, and no alarm occurs. When a regular signal is transmitted from the transmitting station to the receiving station, the test signal is automatically switched to a regular signal on the transmitting station side.

8 Claims, 10 Drawing Sheets

TRANSMISSION DEVICE

BACKGROUND OF THE INVENTION

1. Field of the Invention

The present invention relates to a transmission device provided with an optical transmission line.

2. Description of the Related Art

In a transmission device constituting a network, in order to put a line in a service-in state (enable a signal to run through end-to-end), settings, such as line registration, cross-connect connection and the like must be made across the entire signal route. For this purpose, sometimes an end-to-end setting is completed beforehand and the network is made ready to be used when the termination line is connected. However, if the network is left in the state where the termination line is disconnected, optical signals cannot be received. Therefore, the transmission device regards this state as a failure, and a main signal disconnection alarm is issued. In a SDH/SONET transmission device, the alarm is transmitted along a signal route as an alarm indication signal (AIS) alarm, and is detected at all of several alarm monitor points. If the network accommodates a plurality of paths, the alarm is transmitted through the network as a path-AIS alarm, and an alarm is issued everywhere. It takes trouble equivalent to line setting to individually provide a setting for masking this path-AIS alarm at each alarm detection point. Furthermore, there is a possibility of forgetting a mask release to enable the essential alarm detection function.

In other words, if the function of a transmission device is switched on although optical signals do not run through a transmission line when a network on which transmission devices are connected through an optical transmission line is started up, the transmission device determines the state as a signal disconnection state and issues an alarm, which is a problem.

FIG. 1 explains the problem of the prior art.

FIG. 1 shows a state where a network is disconnected at the route termination part after a signal route is established between a station A and a station C through a station B. In FIG. 1, a loss-of-signal (LOS) alarm is detected at a signal input part, and an STS path alarm indication signal (AIS-P) alarm issued and transmitted after that by it is detected at each alarm detection point as an AIS-P alarm.

As prior arts there are Patent References 1 and 2.

In Patent reference 1, a test system for detecting the signal running state is built in order to remotely detect a signal running state between terminal devices. In Patent Reference 2, as a line service state, one of a non-operation state, an operation state and a temporary non-operation state can be selected. When the temporary non-operation state is selected, an alarm is prevented from terminating if the line is in an alarm state.

Patent Reference 1: Japanese Patent Application No. 2004-40441

Patent Reference 2: Japanese Patent Application No. H10-336322

Although such alarm detection is necessary as a failure occurrence notice in a service-in state, it is troublesome when the line is intentionally disconnected after the line is completed as a standby line. Although some devices have a function to mask the detection of the alarm, in that case, a masking setting must be made at each alarm detection point, and accordingly, it is troublesome.

SUMMARY OF THE INVENTION

It is an object of the present invention to provide a transmission device capable of easily solve the problem that an alarm is detected at each alarm detection point in a state where a network is established and signals are intentionally disconnected.

The transmission device of the present invention comprises a transmitting terminal station, a receiving terminal station, a relay station and a transmission line for connecting them. A terminal station comprises a selection/output unit for selecting and outputting either a regular signal or a test signal to be transmitted to the receiving terminal station, a setting control unit for setting the transmission device to either a normal mode or a standby mode, a signal detection unit for detecting whether there is a signal from the external input line of the transmitting terminal station and a selection/output control unit for enabling the selection/output unit to select and output the test signal when the transmission device is in the standby mode and when there is no signal from the external input line of the transmitting terminal station. If no signal to be transmitted is not transmitted yet although the line setting of the transmission device is completed, the transmission device prevents the transmitting terminal station, the receiving terminal station and the relay station from issuing an alarm by transmitting the test signal instead of the signal to be transmitted.

According to the present invention, a simple configuration can prevent the alarm detection of a standby line.

DESCRIPTION OF THE PREFERRED EMBODIMENTS

The present invention can prepare for service-in while preventing the issuance of LOS and path-AIS alarms even in a state where a service setting is completed end-to-end, by inserting a test signal in the input line of a terminal station in which no signal is not inserted as a standby line on the transmission device side.

Figure 1:
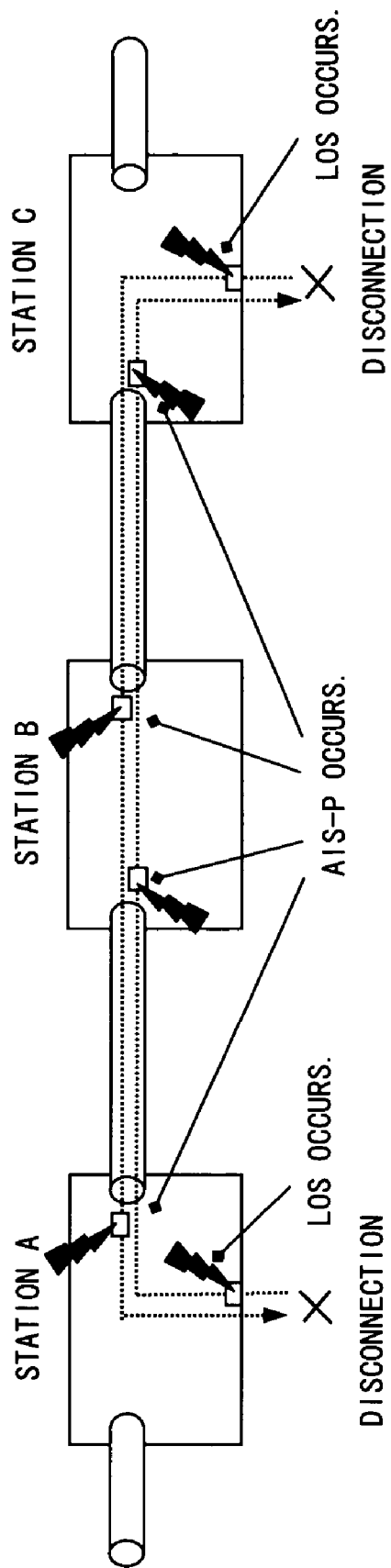
FIG. 1 explains the problem of the prior art.
Figure 2:
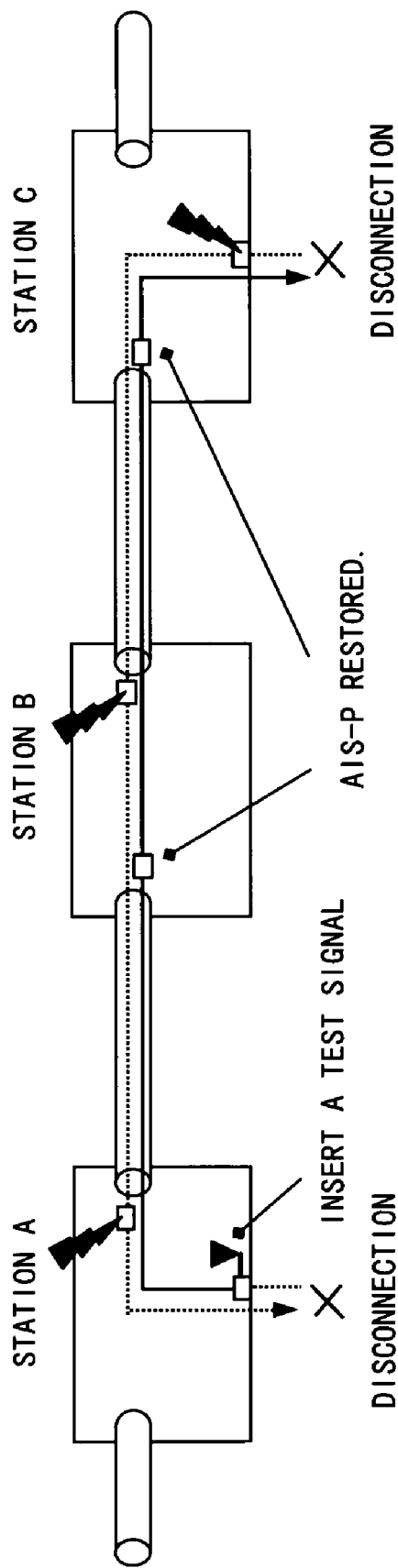
FIG. 2 shows the basic configuration of the preferred embodiment of the present invention.

FIG. 2 shows the basic configuration of the preferred embodiment of the present invention.

FIG. 2 shows a state where a test signal is inserted in the termination line of station A. By inserting a test signal in the termination line of station A, the input side LOS alarm of station A is restored, and instead of an AIS-P signal, a test pattern signal runs through a route after that. Thus, no alarm is detected at each alarm detection point.

A test signal has the same frame structure as a regular signal, and is composed of a header indicating that it is a test signal and a payload in which a proper pattern signal is embedded.

If in the preferred embodiment of the present invention, a line is connected when servicing in a standby line and a normal input signal is obtained, the insertion of a test signal is automatically stopped and the line automatically transits to a regular operation state of transmitting input signals inserted from the outside.

Figure 3:
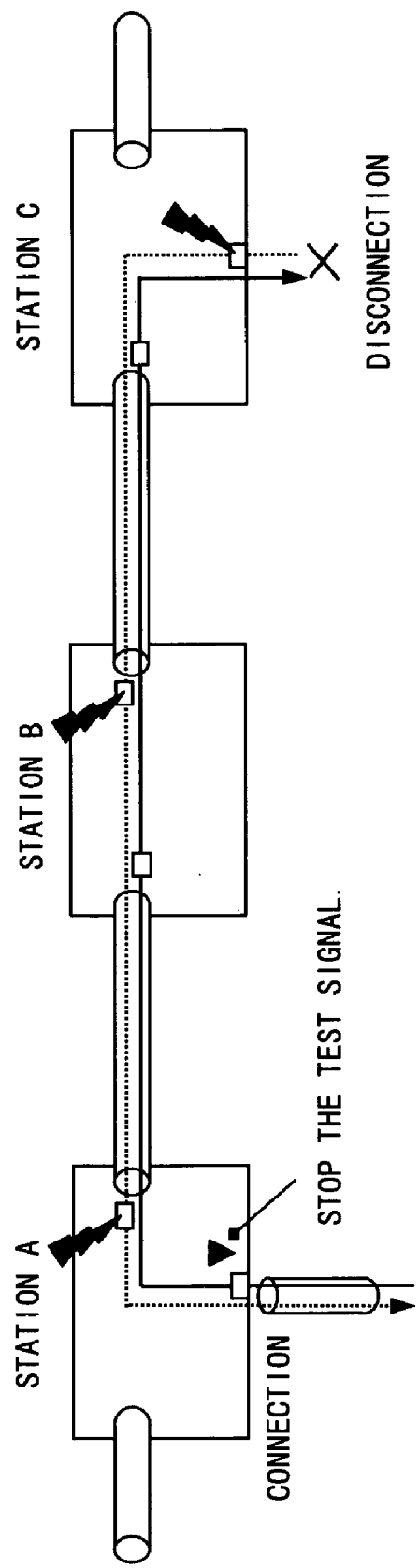
FIG. 3 shows a case where a test signal is automatically stopped by line connection according to the preferred embodiment of the present invention.

FIG. 3 shows a case where a test signal is automatically stopped by line connection in the preferred embodiment of the present invention.

FIG. 3 shows a state where the termination line of station A is connected and a normal input signal is inserted. In this case, station A stops the insertion of a test signal and a connected input signal runs along a transmission route, instead of a test signal.

Even when the insertion of a test signal is stopped, as shown in FIG. 3, a test signal is inserted if the line is disconnected again. However, a waiting time is provided until the input signal is stabilized, and if stabilized signal input beyond the waiting time is confirmed, no test signal is automatically inserted for a waiting time even if the line is disconnected after that. Thus, failure detection is not disturbed after regular service-in.

Figure 4:
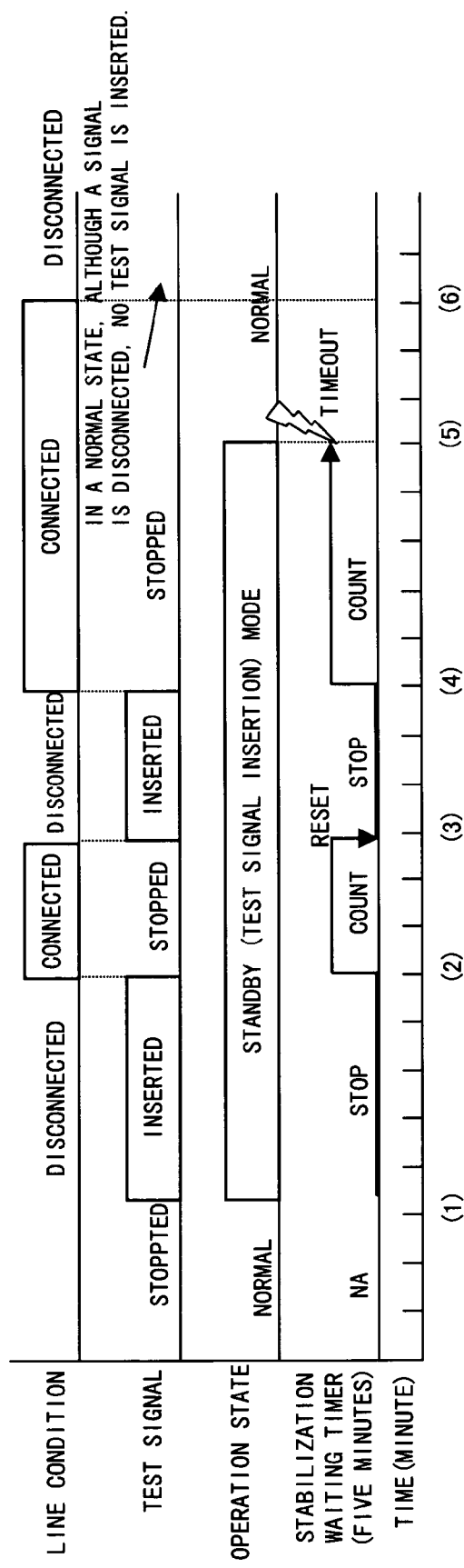
FIG. 4 is a sequence chart showing a test signal insertion operation following the change of a line state according to the preferred embodiment of the present invention.

FIG. 4 is a sequence chart showing a test signal insertion operation following the change of a line state according to the preferred embodiment of the present invention.

(1) Firstly, after line setting, the line is shifted to a standby mode by the instruction (operation) of the maintenance personnel. In this case, if there is no input signal, a test signal is inserted.
(2) Since a line is connected and a signal is inputted to the input line of a terminal station from outside, the insertion of a test signal is stopped. Simultaneously, a timer for evaluating the stabilization of an input signal (stabilization waiting timer) is started.
(3) Since the line is disconnected before a stabilization waiting time (for example, five minutes) elapses, a test signal is inserted again while maintaining the stand mode. The stabilization waiting timer is reset and stopped.
(4) Since the line is connected and a signal is inputted to the input line of the terminal station from the outside again, the insertion of a test signal is stopped again. Simultaneously, the timer for evaluating the stabilization of an input signal is started again. (the same as operation (2)).
(5) Since the stabilized supply of input signals can be confirmed by the timeout of the stabilization waiting time (for example, five minutes has elapsed), the line is shifted from the standby mode to a normal mode.
(6) If there is line disconnection in the normal mode, no test signal is inserted even when the input of signals stops, and an alarm is detected. In this case, a normal mode means the state of a normal service-in.

If the line is already connected when in operation (1), the line is shifted to a standby mode, the stabilization waiting timer is started without inserting a test signal. Namely, it is operation (4).

If a far-end termination device for receiving a test signal inserted in a standby line receives a specific test signal pattern on the output side of a termination line, terminal loop-back control is automatically performed and a received signal is looped back in the reverse direction. Thus, by applying a setting only to one termination line, a two-way line can be made on standby and an alarm can be released.

In this case, the terminal loop-back control is performed only when there is no input signal to the termination line, and there is an input signal, an external input signal is transmitted through the transmission line.

Figure 5:
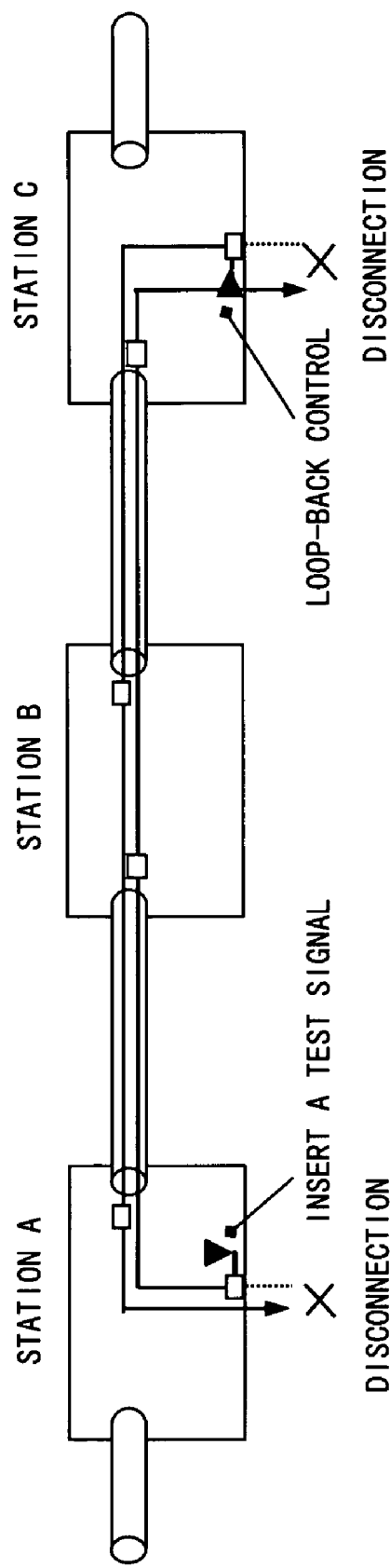
FIG. 5 shows a case where loop-back control is performed according to the preferred embodiment of the present invention.

FIG. 5 shows a case where loop-back control is performed according to the preferred embodiment of the present invention.

FIG. 5 shows a state (loop-back state) where a test signal inserted in station A is looped back to the input side of the line at the termination/output stage of station C. Station C monitors an output signal, detects a test signal there and performs loop-back control only when there is no input signal from an external line.

Independent one-way standby lines can be prepared by the mechanisms shown in FIGS. 2 through 4. However, if the mechanism described here is added, only by making a standby line setting in one termination device, both up and down direction lines can be made on standby at one time, and accordingly, the setting load of the maintenance personnel can be reduced.

If a receiving termination device (in this case, station C) is provided with a test signal insertion function, instead of the loop-back control, the relevant device generates a test signal and inserts it in the reverse direction. In this case, although a function to monitor an output signal must be added, no loop-back function is needed. Thus, the same effect as loop-back control can be obtained.

In this case, a test signal is detected from an output signal, and only when there is no external input signal, the test signal is inserted in the reverse direction.

If a test signal is received from a remote device when there is no instruction on the relevant device from the maintenance personnel, a test signal is automatically inserted without particularly setting any dependent operation.

As described earlier, whether or not a received signal is a test signal can be determined by seeing header information included in a signal frame.

Figure 6:
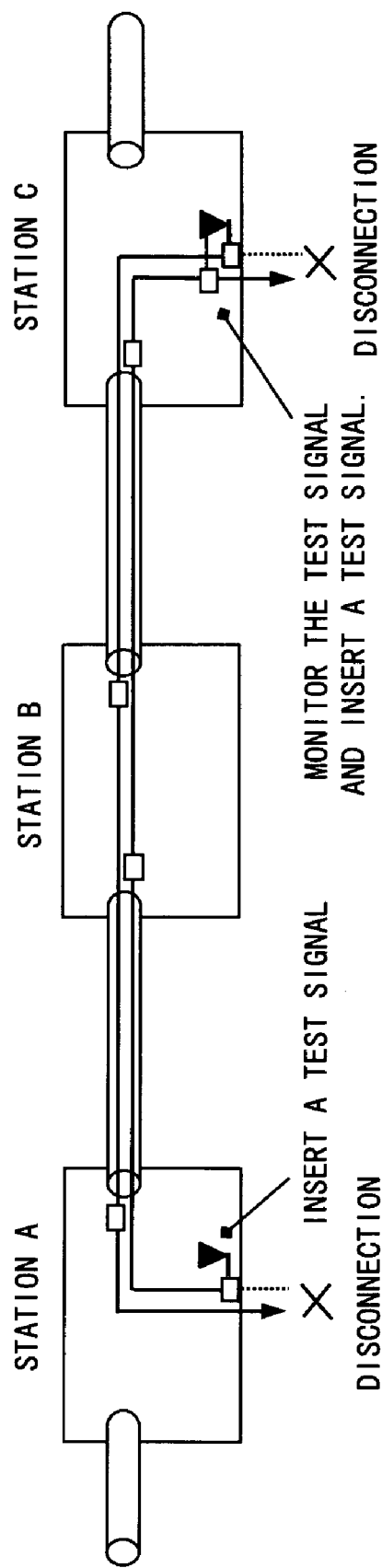
FIG. 6 shows a configuration for generating a test signal on the receiving side and transmitting the signal according to the preferred embodiment of the present invention.

FIG. 6 shows a configuration for generating a test signal on the receiving side and transmitting the signal according to the preferred embodiment of the present invention.

FIG. 6 shows a state where a test signal is also inserted in the input side of the line even at the termination/output stage of station C depending on station A in which a test signal is inserted. In this case, station C monitors an output signal, detects a test signal there and inserts a test signal only when there is no input signal.

The configuration of a test signal insertion part of a terminal station is shown.

Figure 7:
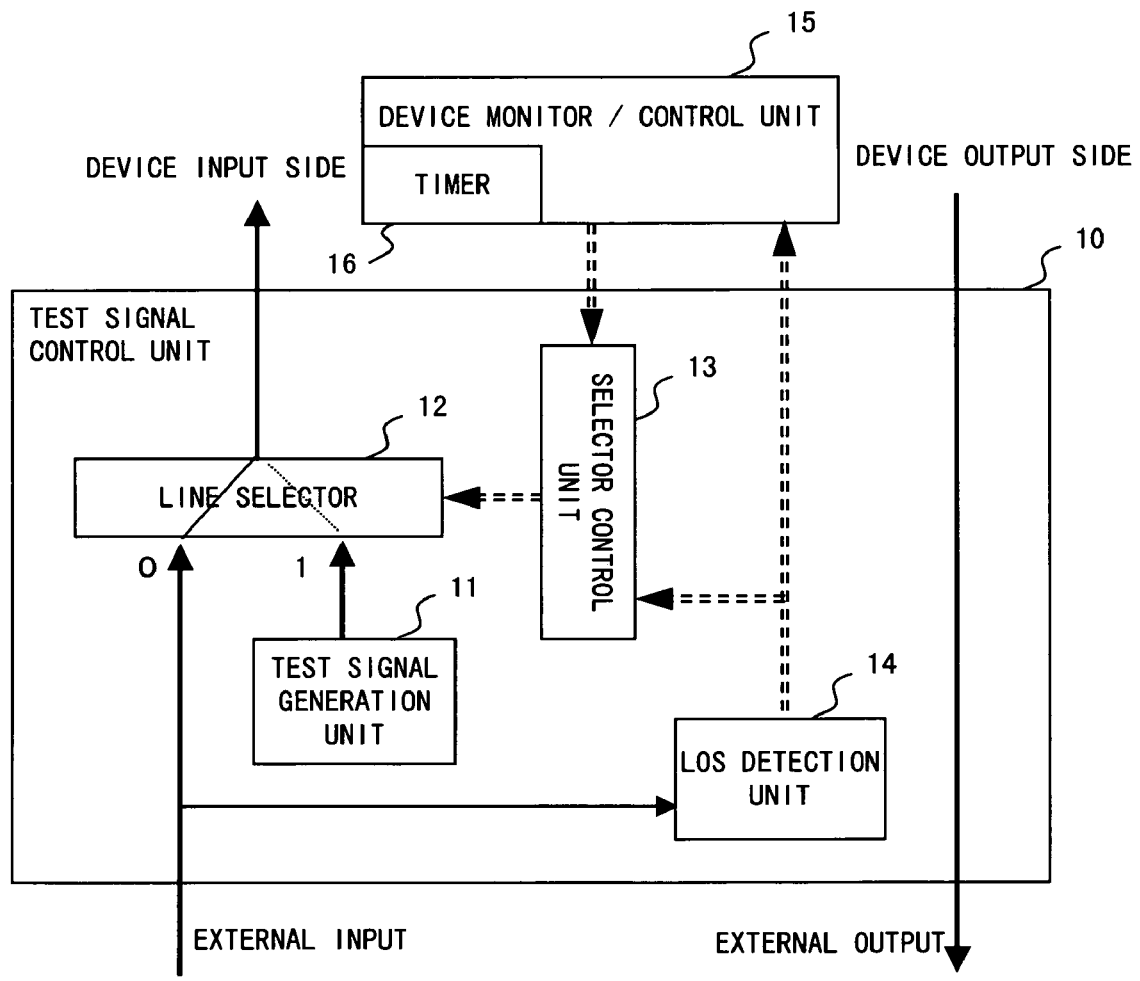
FIG. 7 shows the configuration of a first test signal insertion part according to the preferred embodiment of the present invention.

FIG. 7 shows the configuration of a first test signal insertion part according to the preferred embodiment of the present invention.

A test signal control unit 10 performs the insertion control of a test signal. A test signal generation unit 11 generates a test signal of the same format (frame structure) as an external input signal. A line selector 12 selects and outputs either an external input signal or a test signal generated by the test signal generation unit 11. A selector control unit 13 issues a switching instruction to the line selector 12 on input conditions from an LOS detection unit 14 and a device monitor/control unit 15. The LOS detection unit 14 monitors whether there is an external input signal, and notifies the selector control unit 13 and the device monitor/control unit 15 of the state of an input signal (LOS existence/non-existence).

The Device monitor/control unit 15 monitors the entire device and performs a process or makes a response according to the instruction of the maintenance personnel. The test signal control unit 10 establishes an operation mode (normal/standby), based on the existence/non-existence of a standby request from the maintenance personnel, the state of an input signal notified by the LOS detection unit 14 and the result of a timer 16, and notifies the selector control unit 13 of it. The timer 16 is an input signal stabilization waiting timer. The timer 16 counts time according to an instruction from the device monitor/control unit 15 and notifies the device monitor/control unit 15 of timeout when a specified stabilization time elapses.

Table 1 shows the selection logic of the selector control unit 13.

TABLE 1

| Input conditions | | Output |
| --- | --- | --- |
| Instruction (Mode) of device monitor/control unit 15 | Result (Signal state) of LOS detection unit 14 | Selection instruction of line SEL 12 |
| Normal | Normal | 0: External input |
| Normal | LOS | 0: External input |
| Standby | Normal | 0: External input |
| Standby | LOS | 1: Test signal |

As shown in Table 1, the selector control unit 13 shows that information from the device monitor/control unit 15 indicates that the system is in a standby mode. Only when the LOS detection unit 14 detects signal disconnection (LOS), the selector control unit 13 enables the line selector to select a test signal. In other cases, the selector control unit 13 enables the line selector to select an external input.

Figure 8:
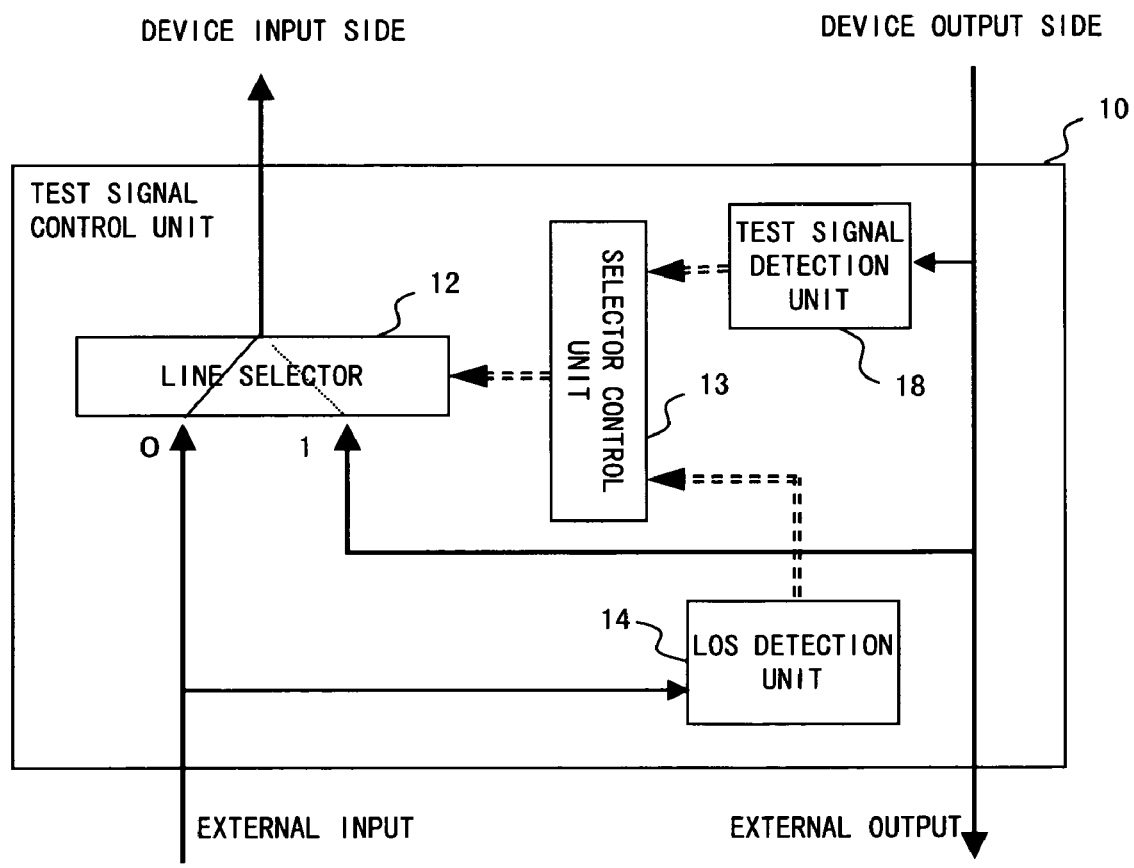
FIG. 8 shows the configuration of the loop-back part of the terminal station according to the preferred embodiment of the present invention.

FIG. 8 shows the configuration of the loop-back part of the terminal station according to the preferred embodiment of the present invention.

The test signal control unit 10 also performs the loop-back control of a test signal. The line selector 12 selects either an external input signal or an output side loop-back signal. The selector control unit 13 issues a switching instruction to the line selector 12 on input conditions from the LOS detection unit 14 and the test signal detection unit 18. The LOS detection unit 14 monitors an external input signal state and notifies the selector control unit 13 of the state of an input signal (LOS existence/non-existence).

The test signal detection unit 18 detects whether there is a rest signal from a signal on the output side, and notifies the selector control unit 13 of its result.

Table 2 shows the selection logic of the selector control unit 13.

TABLE 2

| Input conditions | | Output |
| --- | --- | --- |
| Result (Signal state) of test signal detection unit 18 | Result (Signal state) of LOS detection unit 14 | Selection instruction of line SEL 12 |
| No test signal | Normal | 0: External input |
| No test signal | LOS | 0: External input |
| A test signal | Normal | 0: External input |
| A test signal | LOS | 1: Loop-back |

As is clear from Table 2, the test signal detection unit 18 detects a test signal, and only when the LOS detection unit 14 detects signal disconnection (LOS), it loops it back. In other cases, the line selector 12 is controlled to select an external input.

Figure 9:
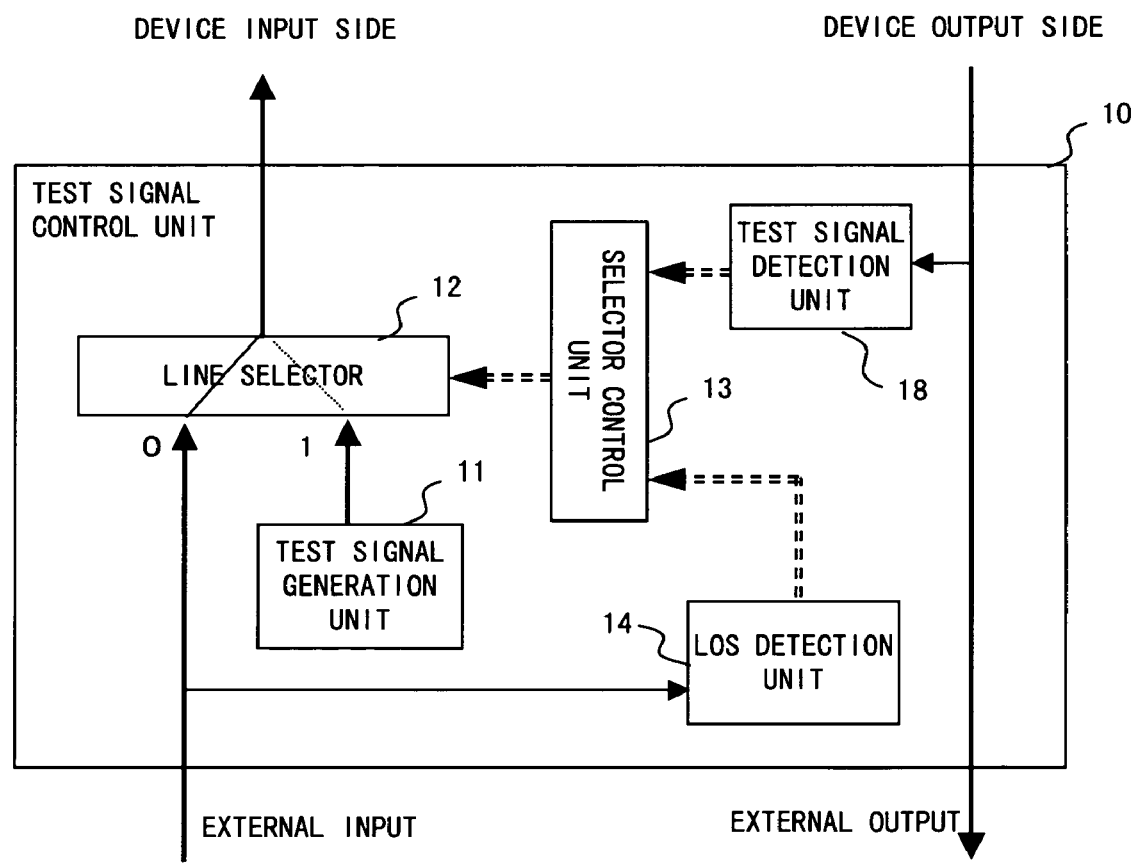
FIG. 9 shows the configuration of a second test signal insertion part corresponding to the configuration shown in FIG. 6 according to the preferred embodiment of the present invention.

FIG. 9 shows the configuration of a second test signal insertion part corresponding to the configuration shown in FIG. 6 according to the preferred embodiment of the present invention.

The test signal control unit 10 performs the insertion control of a test signal. The test signal generation unit 11 generates a test signal in the same format as an external input signal. The line selector 12 selects either an external input signal or a test signal generated by the test signal generation unit 11. The selector control unit 13 issues a switching instruction to the line selector 12 according to input conditions from the LOS detection unit 14 and the test signal detection unit 18. The LOS detection unit 14 monitors the external input signal state and notifies the selector signal control unit 13 of the state of an input signal (LOS existence/non-existence). The test signal detection unit 18 detects the existence/non-existence of a test signal from a signal on the output side and notifies the selector control unit 13 of the result.

Table 3 shows the selection logic of the selector control unit.

TABLE 3

| Input conditions | | Output |
| --- | --- | --- |
| Result (Signal state) of test signal detection unit 18 | Result (Signal state) of LOS detection unit 14 | Selection instruction of line SEL 12 |
| No test signal | Normal | 0: External input |
| No test signal | LOS | 0: External input |
| A test signal | Normal | 0: External input |
| A test signal | LOS | 1: Test signal |

As is clear from Table 3, the test signal detection unit 18 detects a test signal, and only when the LOS detection unit 14 detects signal disconnection (LOS), it enables the line selector 12 to select the test signal. In other cases, it enables the line selector 12 to select the external input.

Figure 10:
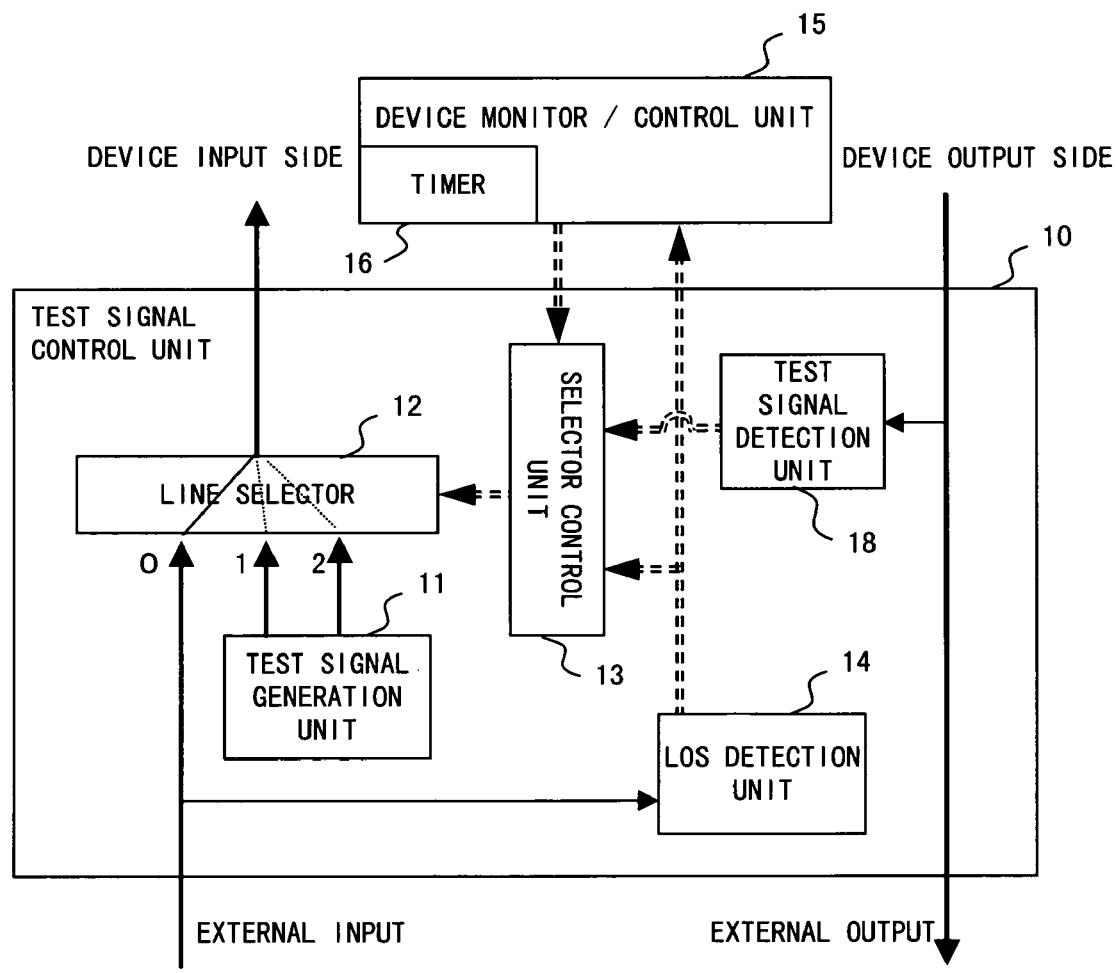
FIG. 10 shows the configuration of a third test signal insertion part capable of corresponding to both the transmitting and receiving sides according to the preferred embodiment of the present invention.

FIG. 10 shows the configuration of a third test signal insertion part capable of corresponding to both the transmitting and receiving sides according to the preferred embodiment of the present invention.

The test signal control unit 10 performs the insertion control of a test signal. The test signal generation unit 11 generates a test signal in the same format as an external input signal. The generated test signal is provided with two types of a signal 1 originated based on the standby request of a local device and a signal 2 originated to loop back a test signal received from a remote device. The line selector 12 selects either an external input signal or a test signal generated by the test signal generation unit 11.

The selector control unit 13 issues a switching instruction to the line selector 12 according to input conditions from the LOS detection unit 14, the device monitor/control unit 15 and the test signal detection unit 18. The LOS detection unit 14 monitors the external input signal state and notifies the selector signal control unit 13 and the device monitor/control unit 15 of the state of an input signal (LOS existence/non-existence). The device monitor/control unit 15 monitors the entire device, and processes/responds according to the instruction of the maintenance personnel. As to the test signal control, the device monitor/control unit 15 establishes an operation mode (normal/standby), based on the existence/non-existence of a standby request from the maintenance personnel, the state of an input signal notified by the LOS detection unit 14 and the result of the timer 16, and notifies the selector control unit 13 of it.

The timer 16 is a stabilization waiting timer for an input signal. The timer 16 counts time according to an instruction from the device monitor/control unit 15, and notifies the device monitor/control unit 15 of its timeout when a specified stabilization time elapses. The test signal detection unit 18 detects the existence/non-existence of a test signal and its type from a signal on the output side, and notifies the selector control unit 13 of the result.

If a test signal simply is looped back and responded when receiving the test signal from the remote device, the endless loop of a test signal on the same conditions occurs in the local and remote devices, and the release of the standby request has no effect.

In order to prevent this, a test signal is originated/detected separating a voluntary case due to a standby case from a passive case by the remote device (in the case of originating upon receipt, a test signal is distinguished by attaching a specific label to the maintenance overhead of a signal or the like).

Table 4 shows the selection logic of the selector control unit 13.

TABLE 4

| Input conditions | | | |
|---|---|---|---|
| Result (Signal state) of test signal detection unit 18 | Instruction of device monitor/control unit 15 | Result (Signal state) of LOS detection unit 14 | Output Selection instruction of line SEL 12 |
| No test signal | Normal | Normal | 0: External input |
| No test signal | Normal | LOS | 0: External input |
| No test signal | Standby | Normal | 0: External input |
| No test signal | Standby | LOS | 1: Test signal |
| A test signal 1 | Normal | Normal | 0: External input |
| A test signal 1 | Normal | LOS | 2: Test signal |
| A test signal 1 | Standby | Normal | 0: External input |
| A test signal 1 | Standby | LOS | 1: Test signal |
| A test signal 2 | Normal | Normal | 0: External input |
| A test signal 2 | Normal | LOS | 0: External input |
| A test signal 2 | Standby | Normal | 0: External input |
| A test signal 2 | Standby | LOS | 1: Test signal |

If the detection result of the test signal detection unit 18 is one of no test signal and test signals 1 and 2, if the device monitor/control unit 15 is in a standby mode and if the LOS detection unit 14 detects signal disconnection (LOS), the line selector 12 is made to select the test signal 1, that is, a test signal indicating that the relevant device is the transmitting side. If the test signal detected by the test signal detection unit 18 is the test signal 1, if the device monitor/control unit 15 is in a normal mode and if the LOS detection unit 14 detects signal disconnection (LOS), the line selector 12 is made to select the test signal 2 indicating that the relevant device is the receiving side. In Table 4, as to the detection and origination, numbers 1 and 2 mean "voluntary" and "passive", respectively. The type pf a test signal can be distinguished by the type information of a test signal, contained in its header. The test signal detection unit 18 detects whether the signal is a test signal 1 or 2, or a regular signal, based on the header of the signal.

By the above-mentioned mechanism, even if a line is disconnected after an operation setting is completed, the detection of an unnecessary alarm can be across the entire signal route, and maintenance which can be immediately serviced in by connecting a line when starting the operation can be provided. Since it is sufficient if a standby setting is made only on one termination device, the setting load of the maintenance personnel is light. Since when starting the operation, the standby mode can be automatically released by connecting a line, there is no possibility that its release is forgotten, and accordingly, the system can surely enter into the right operating state.

According to the present invention, since a test signal always runs through a line which is set to a standby state, line quality can be caught beforehand and there is no need to conduct a line quality test. Therefore, no facilities such as a measuring instrument and the like are needed, and accordingly, installation work at the time of operation start can be reduced.

What is claimed is:

1. A transmission system which comprises a transmitting terminal station, a receiving terminal station, a relay station and a transmission line for connecting them, said transmitting terminal station, comprising:
    a selection/output unit for selecting and outputting either a regular signal or a test signal to be transmitted to the receiving terminal station;
    a setting control unit for setting the transmission device to either a normal mode or a standby mode;
    a signal detection unit for detecting whether there is a signal from an external input line of the transmitting terminal station; and
    a selection/output control unit for enabling the selection/output unit to select and output a test signal when the transmission device is in the standby mode and when there is no signal from the external input line of the transmitting terminal station, wherein said transmission device prevents the transmitting terminal station, the receiving terminal station and the relay station from issuing an alarm by transmitting a test signal instead of the signal to be transmitted if no signal to be transmitted is not transmitted yet although a line setting of the transmission device is completed.

2. The transmission system according to claim 1, wherein when there is no signal to said receiving terminal station from the external input line and it is determined that said transmission device is in a standby mode, said receiving terminal station transmits a test signal to an up stream line established between said receiving and transmitting terminal stations.

3. The transmission system according to claim 2, wherein said receiving terminal station loops back a test signal transmitted from said transmitting terminal station.

4. The transmission system according to claim 2, wherein said receiving terminal station transmits a test signal uniquely generated by said receiving terminal station to said transmitting terminal station.

5. The transmission system according to claim 1, wherein the test signal includes first and second test signals, and said terminal station further comprises a test signal type detection unit for detecting a type of the test signal, and when there is no signal from the external input line, said transmission device is in a normal mode and when it is determined that the first test signal is transmitted from said transmitting terminal station, the second test signal is transmitted to an opposite line of a line over which the first test signal is transmitted.

6. The transmission system according to claim 1, wherein the test signal is in the same format as the regular signal.

7. The transmission system according to claim 1, wherein said terminal station further comprises a timer for counting for a predetermined time since a regular signal is first transmitted through said transmission line, and when a regular signal continues to be transmitted even after said timer counts for the predetermined time, said transmission device is automatically switched from a standby mode to normal mode.

8. A signal transmission control method of a transmission device which comprises a transmitting terminal station, a receiving terminal station, a relay station and a transmission line for connecting them, the method comprising:

providing a selection/output unit for selecting either a regular signal or a test signal to be transmitted to said receiving station;

setting said transmission device to either a normal mode or a standby mode;

detecting whether there is a signal from an external input line of said transmitting terminal station;

enabling the selection/output unit to select and output a test signal when said transmission device is in a standby mode and when there is no signal from the external input line of said transmitting terminal station; and wherein when there is no signal to be transmitted although a line setting of said transmission device is completed, occurrence of an alarm in said transmitting terminal station, said receiving terminal station and said relay station is prevented by transmitting the test signal instead.

* * * * *